(No Model.)
S. S. BLACK.
AGRICULTURAL IMPLEMENT FOR IRRIGATING.
No. 445,510. Patented Jan. 27, 1891.
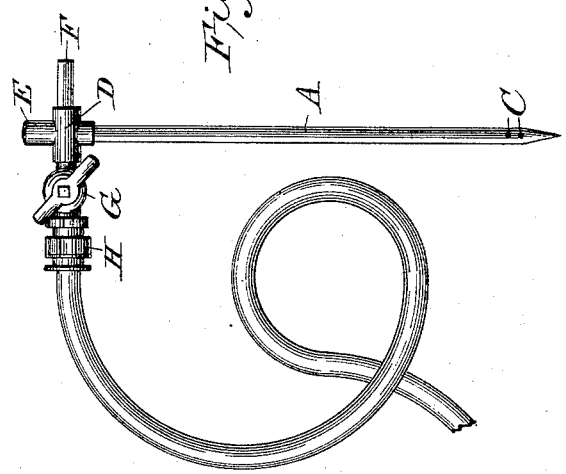
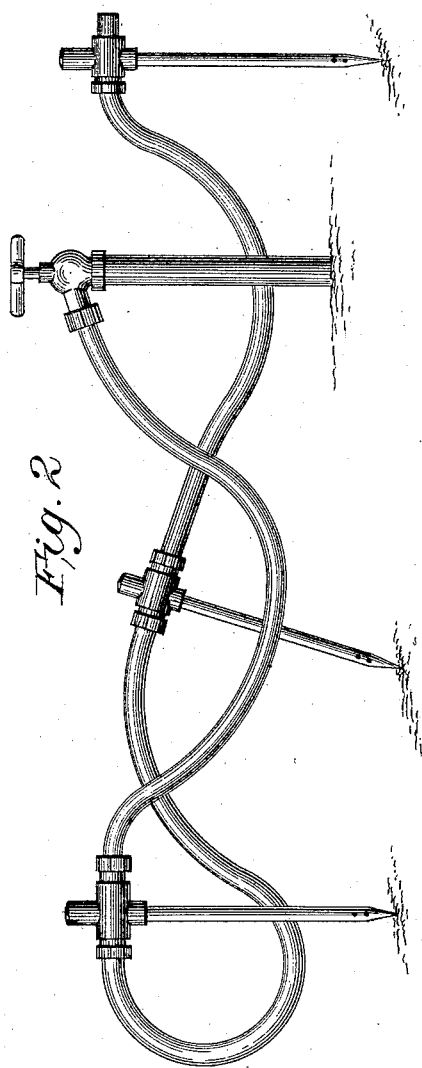
Witnesses:
N. A. Black
G. A. Ottmann
Inventor.
S. S. Black

UNITED STATES PATENT OFFICE.

STEPHEN S. BLACK, OF PASADENA, CALIFORNIA.

AGRICULTURAL IMPLEMENT FOR IRRIGATING.

SPECIFICATION forming part of Letters Patent No. 445,510, dated January 27, 1891.

Application filed March 28, 1890. Serial No. 345,780. (No model.)

*To all whom it may concern:*

Be it known that I, STEPHEN S. BLACK, a citizen of the United States, residing at Pasadena, in the county of Los Angeles and State of California, have invented a new and useful Instrument for Irrigating the Roots of Trees and Shrubs, of which the following is a specification.

My invention relates to new and improved methods of irrigating; and it consists of a hollow needle or pipe A, (shown in Figure 1 of the accompanying drawings,) with a sharp point B, adapted to entering the ground easily when forced into it, and having near the point or lower extremity one or more eyes C C, communicating with the bore or line of the pipe. The upper end or proximal extremity of the pipe is provided with a fitting known as a "cross" D, one arm of which is a little longer than the others, and is cast solid instead of in the usual method. This solid arm forms the head E of the needle, and is adapted to receive blows from a maul or other tool when necessary for the purpose of driving the needle into hardened ground. The cross-arms are used for attaching a short handle F on one side, and on the other for attaching a "stop-off cock" G, to which is affixed an ordinary hose-coupling H. When it is desired to use a number of the needles in series on one line of hose—as, for instance, in irrigating a row of orchard-trees—the stop-off cock G is dispensed with and a hose-coupling is attached to each side of the cross in all the needles except the terminal, on a line of hose which has one side of cross closed, as first described, and shown in Fig. 1.

The objects of my invention are, primarily, to do the greatest amount of good possible with a limited supply of water; secondly, to keep trees and shrubs properly supplied with moisture and in healthy condition with the least expenditure of labor; thirdly, to facilitate the irrigation of trees on side hills and rough ground, where water cannot be used in the ordinary way.

It is well known that in most countries where irrigation is practiced water is valuable and should be used with economy in the dry season. It is also well known that surface irrigation of any kind will produce a hardpan near the surface in many varieties of soil, this hardpan lying between the loose surface soil, which is produced and maintained by cultivation or frequent stirring, and the moist subsoil. The usual method of applying water to trees is by running it down numerous furrows between the trees, or by first forming basins around the trunks of the trees and then filling them with water. Just at the proper time after the water has soaked in, the ground must be cultivated to stop evaporation and baking of the surface. If this is neglected, the ground cracks, the moisture evaporates rapidly, and the trees suffer. The loose layer of soil on top acts as a blanket or protection for the moist subsoil, preventing rapid evaporation. It will be seen that surface irrigation, with the preparation of the ground beforehand and the necessary prompt cultivation afterward, involves a large amount of labor and great expenditure of water, with no exact distribution of the fluid. With the use of my instrument these difficulties are largely overcome. The manner of using it is as follows:

Attach an ordinary garden-hose to the coupling H, the other extremity being attached to the hydrant. Turn on the water while the cock G is still closed. Then force the needle into the ground near the root of the tree to be watered to a depth of about eighteen inches, or until it is through the surface hardpan, if there be one. Then turn on the water through the stop-cock—a very gentle flow for the first two or three minutes—until the ground around the point has become wet for a little distance. It will then take up readily the whole flow of the pipe under a strong pressure until the ground for a large area about the roots is thoroughly moist. The action of the ground under these circumstances is like that of a damp sponge—viz., it sucks up the water by capillary attraction, while the dry soil on the surface remains dry and prevents evaporation, not requiring cultivation, as in the ordinary method of applying water. I have learned, also, by frequent observation that water applied in this way under a hardpan will soon soften it up by moisture from below, and that it will remain permanently loose.

In orchard use a number of needles are placed in series on a line of hose, as shown in Fig. 2. The amount of water delivered by the needles in a given time can be measured and the quantity deposited under each tree can be calculated accordingly.

I am aware that sub-irrigation by means of fixed pipes laid under ground has been used. I therefore do not claim the application of water below the surface as my invention.

I am aware, also, that it is not new to fix permanently into the ground near the roots of trees open-mouthed vessels or pipes, into which water is poured or allowed to flow for the purpose of sub-irrigation. My invention differs from these in that I employ a light portable hollow metallic needle perforated near its point and provided at its proximal end with a form known to plumbers as a "cross," said cross being provided with hose-couplings, whereby it can be secured water-tight to the line of hose. The last needle—that is to say, the one farthest from the hydrant—is provided with a plug in its cross, as shown in Fig. 2 in the drawings, to close the opening otherwise left. If now the needles be all inserted into the ground and the hose connected with the hydrant, there will be no escape for the water except from the perforations near the needle-points beneath the surface of the ground, thus preventing all loss by leakage and evaporation. The needles are moved at will from point to point, as may be required.

What I claim, and desire to secure by Letters Patent, is—

1. The portable irrigating implement set forth, comprising the combination of a hose, stop-off cock, cross, and pointed tubular needle provided with eyes communicating with its bore near the point.

2. In a portable irrigating implement, the combination, with a line of hose, of hollow pointed metallic needles, each perforated into the bore near its point and each provided with a cross on its proximal end adapted to be secured water-tight in a line of hose.

3. The combination, in a portable irrigating implement, of a hollow pointed metallic needle and cross, said cross being provided with a solid extension in a direction opposite to that occupied by the needle for the purpose of receiving blows, substantially as set forth.

STEPHEN S. BLACK.

Witnesses:
L. A. WRIGHT,
K. S. BLACK.